(12) United States Patent
Song

(10) Patent No.: US 7,831,117 B1
(45) Date of Patent: Nov. 9, 2010

(54) N-NARY OPTICAL SEMICONDUCTOR TRANSISTOR AND AN OPTICAL AND-GATE

(76) Inventor: Shaowen Song, 704 Brandenburg Boulevard, Waterloo, Ontario (CA) N2T 2V4

( * ) Notice: Subject to any disclaimer, the term of this patent is extended or adjusted under 35 U.S.C. 154(b) by 0 days.

(21) Appl. No.: 12/435,434

(22) Filed: May 5, 2009

Related U.S. Application Data

(63) Continuation of application No. 11/702,610, filed on Feb. 6, 2007.

(60) Provisional application No. 60/778,394, filed on Mar. 3, 2006.

(51) Int. Cl.
*G02B 6/12* (2006.01)
(52) U.S. Cl. .................... 385/14; 359/107; 359/108; 257/431
(58) Field of Classification Search .................. 385/14; 359/107, 108; 257/431
See application file for complete search history.

(56) References Cited

U.S. PATENT DOCUMENTS

| 5,194,979 A * | 3/1993 | Koai et al. ............... 398/202 |
| 6,778,303 B2 * | 8/2004 | Song ...................... 359/108 |
| 7,068,866 B2 * | 6/2006 | Wang et al. .............. 385/10 |

* cited by examiner

*Primary Examiner*—Tan N Tran
(74) *Attorney, Agent, or Firm*—Anthony Asquith Corp.

(57) ABSTRACT

An N-nary photonic transistor (PT) based on a heterojunction optical semiconductor microstructure is presented. The PT has one control signal input, one data signal input, and one output. The lights for each input can be one of the wavelengths within the N number (N-nary) of predetermined lightwaves. The output light of the PT is determined by the inputs in accordance with the switching function of the PT. The PT can be used to construct either N-nary digital logic gates or binary Boolean logic gates. For the N-nary system, both the wavelength domain and intensity domain of the lights are used which forms a two dimensional logic system. An optical AND gate, which can be used as either N-nary or binary, is constructed using the current photonic transistor, which is also presented herein.

8 Claims, 7 Drawing Sheets

N-NARY OPTICAL SEMICONDUCTOR TRANSISTOR AND AN OPTICAL AND-GATE

This patent application is a continuation-in-part of U.S. provisional Patent Application No. 60/778,394, filed 3 Mar. 2006 and continuation of U.S. patent application Ser. No. 11/702,610, filed on 6 Feb. 2007

FIELD OF THE INVENTION

The present invention relates to the field of optical (or photonic) computing, N-nary digital logic, photonic transistor, and optical semiconductor logic gates.

BACKGROUND OF THE INVENTION

Similar to digital electronics, digital photonic circuits/chips can be built using logic gates, in which light signals, instead of electrical ones, are used to drive the device. When using light, we have two dimensions available for information encoding and computing, which are the light intensity and the wavelength. In other words, we can use N (N≧1) number of lightwaves, and each one can be at either zero intensity, to represent the binary 0's, or a pre-selected high intensity, to represent the binary 1's. For computing purposes, we can use either the intensities to represent information or the wavelengths or both. If the intensity is used for information encoding, one can have a multiple binary system with each lightwave having two intensities, one for 0's and the other for 1's. If only one wavelength is used in this case, it becomes a single binary system. On the other hand, if the wavelengths are used to encode information, in this case N≧2, we can have an N-valued system with each lightwave being at a constant intensity to be one of the values in the N-valued digital system. If two wavelengths are used in this case, it also becomes a binary system, with one wavelength representing the 0's and the other representing the 1's. However, if both the intensities and the wavelengths are used for information representation and manipulation, we can have a two dimensional logic system that not only provides high computation capacity but also can be constructed in a way so that the transitional functions among the digital values in the system to be simple and implantable by optical semiconductors. Based on these considerations, we constructed an N-valued digital logic system that defines the transition functions among the N values to achieve N-nary computing using both light intensities (only two intensities are used) and wavelengths (N number of wavelengths with N≧1). An N-nary Digital Photonic (NDP) system is established by implementing the transition functions through N-nary phonic logic gates. Using the photonic logic gates one can construct N-nary digital logic photonic circuits/devices. This system was disclosed in U.S. Pat. No. 6,778,303. An N-nary Optical Random Access Memories (O-RAM), according to the N-valued digital logic, was disclosed in U.S. Pat. No. 6,647,163. The design processes of any digital optical devices using the logic gates are similar to those of the binary Boolean digital system. But, the logic used is the N-valued digital logic instead of the Boolean binary logic.

Song (U.S. Pat. No. 6,647,163) constructed N-nary optical logic gates using Semiconductor Optical Amplifiers (SOAs). While the logic gates constructed by SOAs can produce the logic operations, they are not ideal in terms of performances including operation speed and power consumptions, as SOAs were originally designed for optical signal amplifications rather than signal switching. Furthermore, the sizes of SOAs are also relatively large in the realm of digital circuitry, which prevents large scale circuits from being integrated into a semiconductor chip. Another approach of implementing the N-nary photonic logic gates is to first design the photonic transistor (PT), which is a micro-device that allows one lightwave to switch on or off another lightwave. The transistors are then used to construct the photonic gates. Although the structure of the PT can be similar to that of a SOA, it is optimized for optical signal switching rather than amplification. In particular, the size of the PT can be much smaller than that of a SOA, as signal amplification is not required in a photonic transistor, which is very important for digital systems as it allows for a large number of transistors to be integrated into one chip for complex circuits. Smaller size optical semiconductor structure can also significantly reduce the switching time, or in other words increasing the operation speed, and reduce power consumption of the logical gates which are two additional important benefits in practical applications.

This present invention is an N-nary photonic transistor based on a heterojunction optical semiconductor microstructure which is similar to that of a SOA but with different dimension proportions in the structure and most importantly a much smaller size. This present invention of the PT makes it possible to integrate a large number of logic gates into one optical semiconductor chip for practical applications. In the meantime, the current PT also enables much faster logic gates and much lower power consumptions.

The photonic transistor design and computer simulation results are presented. The photonic transistor design presented here has the features of being small in size and power consumption, which makes it useful for integrated photonic chips. An example of using the photonic transistor to construct an optical AND (O-AND) gate (Refer to U.S. Pat. No. 6,778,303) is also presented.

SUMMARY OF THE INVENTION

An N-nary photonic transistor (PT) based on a heterojunction optical semiconductor microstructure is herein disclosed. The PT has one control signal input, one data signal input, and one output. The lights for each input can be one of the wavelengths within the N number (N-nary) of predetermined lightwaves. A special case, when one wavelength is used for both inputs, the current PT becomes a binary transistor. The PT can be used to construct either N-nary digital logic gates or binary Boolean logic gates. For the N-nary system, both the wavelength domain and intensity domain of the lights are used which forms a two dimensional logic system. An optical AND gate, which can be used as either N-nary or binary, is constructed using the current photonic transistor. Computer simulations using commercial software produced satisfactory results for both the photonic transistor and the optical NAD gate.

DETAILED DESCRIPTION OF THE PREFERRED EMBODIMENT

Overview

It is well known that SOAs can be used for wavelength conversions (Refer to: Terji Durhuus, et al, "All-Optical Wavelength Conversion by Semiconductor Optical Amplifiers," in Journal of Lightwave Technology, Vol. 14, No. 6, June 1996, pp. 942-954; Durhuus et al, "All-Optical Wavelength Conversion by SOA's in a Mach-Zehnder Configuration," in IEEE Photonics Technology Letter, Vol. 6, No. 1, January 1994, pp. 53-55; Byongjin Ma and Yoshiaki Nakano, "Realization of All-Optical Wavelength Converter Based on Directionally Coupled Semiconductor Optical Amplifiers," in IEEE Photonics Technology Letters, Vol. 11, No. 2, February 1999; Dagens et al, "Design Optimization of All-Active Mach-Zehnder Wavelength Converters," in IEEE Photonics Technology Letter, Vol. 11, No. 4, April 1999, pp. 424-426; Masumi Saitoh, et al, "Static and Dynamic Characteristics Analysis of All-Optical Wavelength Conversion Using Directionally Coupled Semiconductor Optical Amplifiers," in IEEE Journal of Quantum Electronics, Vol. 36, No. 8, August 2000, pp. 984-990.) and wavelength switching functions (Refer to: H. Ju, et al "Ultrafast All-Optical Switching by Pulse-Induced Birefringence in a Multi-Quantum Well Semiconductor Optical Amplifier," in Proc. CLEO/IQEC 2004/2003, pp. CFJ1-1-CFJ1-3; and Ju et al, "SOA-based All-Optical Switch with Subpicosecond Full Recovery," in OPTICAL EXPRESS, Vol. 13, No. 3, February 2005, pp. 942-947). Some binary Boolean logic gates based on wavelength switching functions have also been demonstrated (Refer to Youlong, et al, "Optical XOR and NXOR Logic Operations with Erasable Self-pumped Phase Conjugation," Optik International Journal for Light and Electron Optics, Vol. 110, No. 2, 1999, pp. 89-93; Houbavlis, et al, "All-Optical XOR in a Semiconductor Optical Amplifier-Assisted Fiber Sagnac Gate," in IEEE Photonics Technology Letters, Vol. 11, No. 3, March 1999, pp. 334-336).

In a number of US patents, all optical Boolean logic gates using varies methods have been disclosed (Refer to: U.S. Pat. No. 7,145,704; 6,943,925; 6,804,047; 6,522,462; 6,151,428; 6,005,791; 5,757,525; 5,144,375; 5,132,983; 4,811,258). Also, a number of methods of Boolean optical transistors have been disclosed (Refer to: U.S. Pat. Nos. 6,943,929; 6,847,054; 6,788,838; 5,502,585; 5,001,523; 4,403,323; 4,382,660; 4,216,485).

The N-Nary Optical Semiconductor Transistor Design

Figure 1:
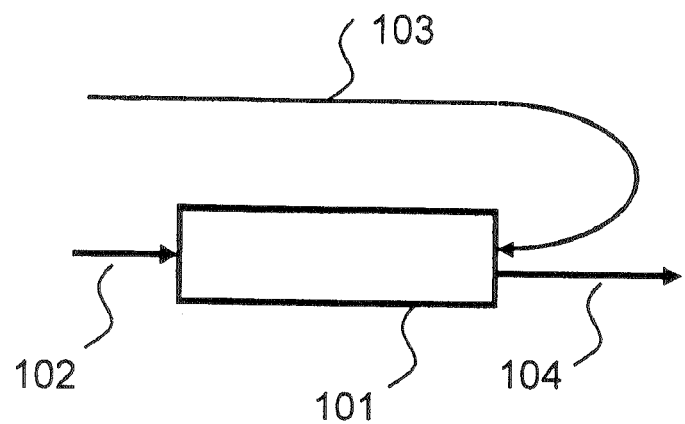
FIG. 1. The configuration of the photonic transistor

A wideband photonic transistor (PT) for the N-nary Digital Photonic (NDP) system (Refer to U.S. Pat. No. 6,778,303), based on a heterojunction travelling waveguide structure, is herein presented. FIG. 1 shows the external configuration (inputs and output ports) of the PT. The PT 101 has one signal input 102, one control input 103, and one output 104. The signal input of the PT takes the data signals and the control input takes the control signals. The signals, for either the control input or the data input, can be any lightwave $\lambda i$ with $\lambda iS(\lambda i1, \lambda i2, \ldots \lambda iN)$, where $S(\lambda i1, \lambda i2, \ldots \lambda iN)$ is the set of the wavelengths from $\lambda i1$ to $\lambda iN$, whereas the wavelength range from $\lambda i1$ to $\lambda iN$ falls into the bandwidth of the PT. The intensities for each lightwave can either be high, a predetermined intensity in the system, or zero (dark). The logic function of the PT which determines the output of the PT for a given set of inputs is defined as: if there is no light (intensity=0) on the control input, the output of the PT will be identical to the data input signal, in both wavelength and intensity. However, if one of the lightwaves $\lambda i$ with $\lambda i\Sigma S(\lambda i1, \lambda i1, \ldots \lambda iN)$, presents on the control input (with the intensity at high), the output of the PT will be at low, with "low" being defined as close to zero (dark). Having this special multi-wavelength switching function, the PT can then be used to construct N-nary logic gates designed for the NDP system. A special case, when only one wavelength is used (N=1), the N-nary logical gates become the Boolean logic binary logic gates.

It is worthy to note that the herein described transistor is actually an inversed transistor compared with the traditional electrical transistor whereas the transistor is switched to on when the control input is at high. Here, the PT is switched to on when the control input is at low. But for simplicity, the herein described inversed-transistor is referred to as a transistor.

Figure 2:
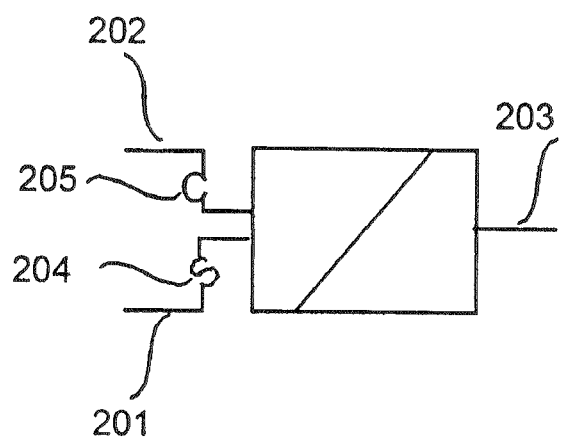
FIG. 2. The logic symbol of the photonic transistor

FIG. 2 shows the logic symbol of the N-nary photonic transistor. It has one signal input 201, one control input 202, and one output 203. An "S" 204 is inserted in the signal input to signify that it is signal input, and a "C" 205 is inserted in the control input to signify that it is the control input.

Figure 3:
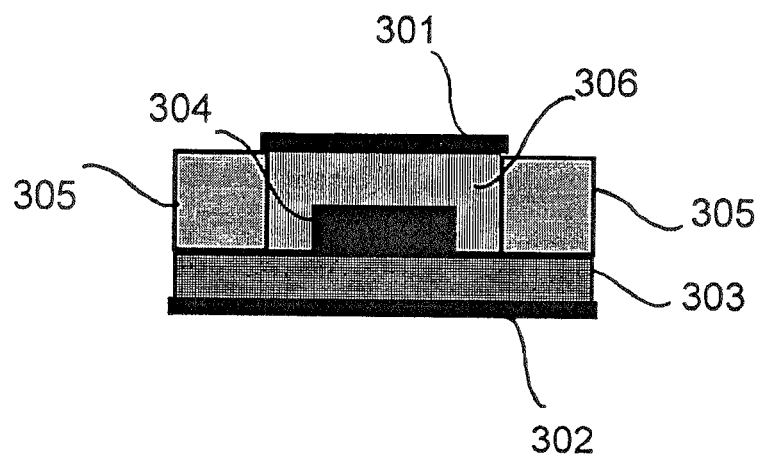
FIG. 3. The cross-section of the photonic transistor

In order to make the PT practically useful, especially in integrated photonic circuits/chips, the PT must have several important properties: (1) It should be wideband so that N number of wavelengths can be used; (2) It should have a small physical dimension so that a large number of transistors can be integrated into one chip; (3) It should have small power consumption so that the total power consumption of the chip can be manageable; and (4) It should be easy for future PT and waveguide integrations. To meet these requirements, a simple heterojunction traveling waveguide structure is designed. FIG. 3 shows the cross-section of the PT, with 301 being the positive electrode, 302 the negative electrode, 303 the N-Inp substrate, 304 the InGaAsP active region, 305 the insulator, 306 the P-Inp layer. This buried ridge architecture provides high confinement coefficients required the PT.

Computer Simulations

Photonic Transistor Simulation Case-1

Figure 4:
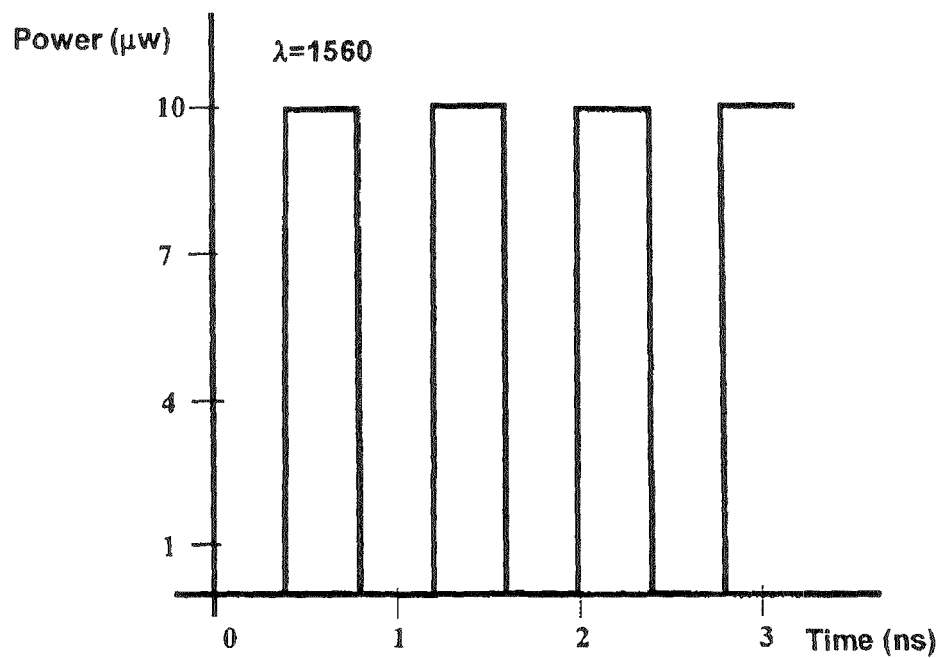
FIG. 4. Control input signal ($\lambda=1560$ nm) for simulation Case-1
Figure 5:
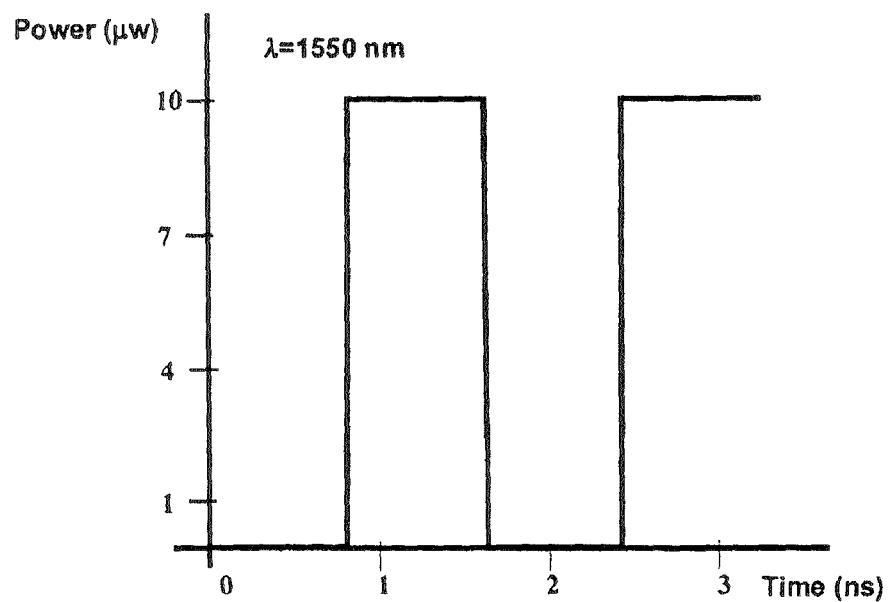
FIG. 5. Data input signal ($\lambda=1550$ nm) for simulation Case-1
Figure 6:
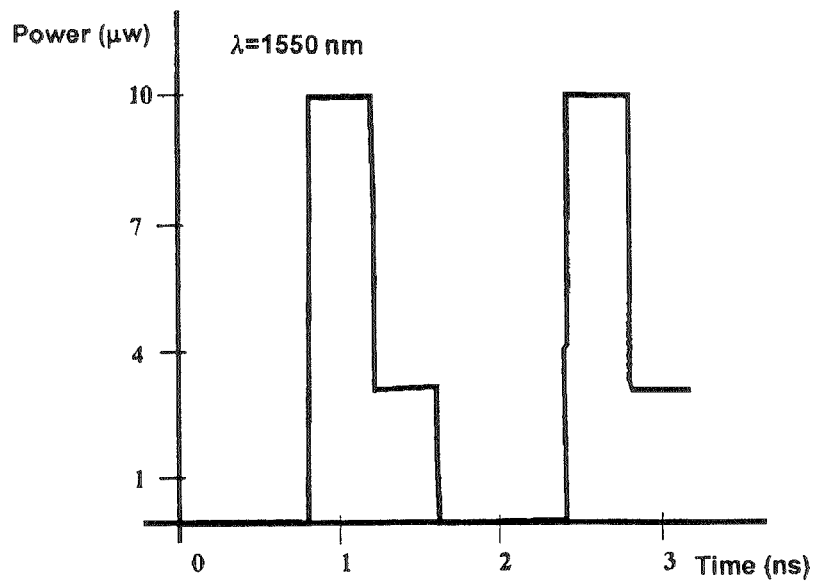
FIG. 6. The output signal of the photonic transistor ($\lambda=1550$ nm) of simulation Case-1

The above described PT design was tested by computer simulations. The control input is generated by a bit generator and an amplitude modulator. The bit sequence was chosen as 01010101. The corresponding control signal is shown in FIG. 4. The wavelength for the modulator is produced by a pump laser. The wavelength was chosen as 1560 nm in this case. The data signal input is also generated by a bit generator and an amplitude modulator. The bit sequence was chosen as 00110011, in order to produce all of the possible combinations between the control input and the signal input. The wavelength for the signal input was chosen as 1550 nm. The corresponding signal waveform is shown in FIG. 5. The output of the transistor is shown in FIG. 6. The wavelength of the output is identical to the signal input, which is 1550 nm in this case.

By comparing the control input and the data input with the output signals, we can see that the PT produces the required transition functions, i.e. when the control input is a zero, the output equals to the signal input, while the control input is high, the output is low. For example, when the time is at 1 ns, the control input signal is at zero, refer to FIG. 4, and the signal input is at high, refer to FIG. 5, the PT output is at high, refer to FIG. 6. When the time is at 1.4 ns, the control input is at high, the signal input is also at high, but the PT output is a low.

From FIG. 6, it can be seen that the low output signal of the PT is about 30% of the output high signal. Ideally, the "low" should be at zero. But, due to the fact that the computer software simulates the cross-gain modulation mechanism of the heterostructure, it results a close-to-zero output. Laboratory experiments have shown that there is "total-saturation" state whereas the output can be at zero when the combined power of signal input and control input reach the saturation level of the structure.

From an application viewpoint, a "total-saturation" PT is ideal, but the "not-at-zero" low PT can also be used to construct N-nary logic gates. When using the "not-at-zero" PTs to construct logic gates, the output of the PTs can further manipulated that the output of the gates will be at either high or zero for each of the lightwaves used in the system. This will be discussed in the following section.

Photonic Transistor Simulation Case-2

Figure 7:
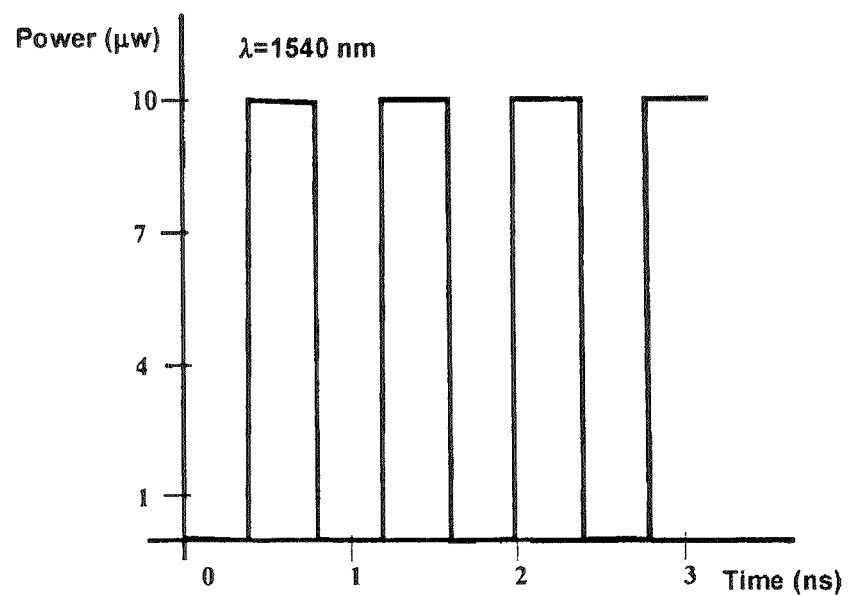
FIG. 7. Control input signal with wavelength of 1540 nm for simulation Case-2
Figure 8:
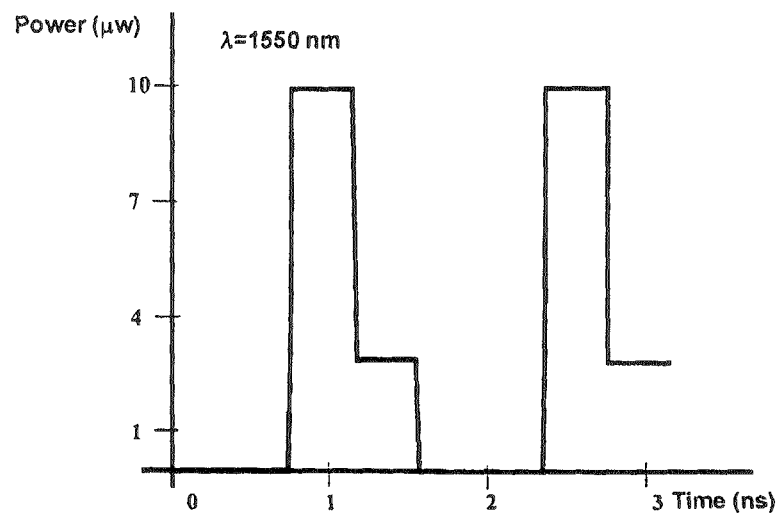
FIG. 8. The output signal of the photonic transistor ($\lambda$=1550 nm) for simulation Case-2

In order to test the bandwidth of the transistor, a second experiment was simulated by changing the wavelength of the control signal to 1540 nm, while keeping the signal input to the transistor at the same wavelength, which is 1550 nm. FIG. 7 is the control signal waveform. The numerical simulated output signal of the transistor for this set of inputs is given in FIG. 8. It can be seen that the output signal maintained the same intensity as the previous test case where the control input had a wavelength of 1560 nm. This indicates that the transistor design has at least 20 nm bandwidth, from 1540 nm to 1560 nm. Therefore, N number of wavelengths within the range of 1540-1560 nm can be chosen for the NDP system, if this transistor is used to construct the N-nary photonic logic gates. The band gap between the wavelengths is determined by the I/O devices of the system. If a 0.4 nm gap is adopted, as used in some DWDM (Dense Wavelength Division Multiplexing) systems, this transistor will provide around 50 wavelengths for information encoding and processing.

An Optical AND (O-AND) Gate Constructed using the Current Photonic Transistor

The O-AND Gate Design

As mentioned earlier, the above discussed photonic transistor can be used to construct logic gates. As an example, the PT is used to construct an N-nary optical AND (O-AND) gate. The logic function of the N-nary O-AND gate is defined as: If the control input has a zero (dark), the output will be zero; but, if any $\lambda i$ with $\lambda i \in S(\lambda i1, \lambda i1, \ldots \lambda iN)$ presents on the control input, the output will be equal to the signal input. Table 1 is the truth table of the O-AND gate. It is worth noting that the N-valued digital logic system is not symmetric, unlike the Boolean logic. The roles of the control input and the data input at the gate level in the NDP system are predefined. However, when only one wavelength is used, the O-AND gate not only becomes symmetric but also, importantly, becomes the standard Boolean binary logic AND gate.

The truth table of the binary O-AND gate is given by Table 2. Since only one wavelength is used in the binary case, and the high intensity represents 1 and the zero intensity represents 0, Table 2 can be rewritten into the standard binary format as shown in Table 3.

TABLE 1

The truth table of the N-nary O-AND

| Signal Input | Control Input | O-AND Gate Output |
|---|---|---|
| 0 | 0 | 0 |
| 0 | $\lambda i$ | 0 |
| $\lambda j$ | 0 | 0 |
| $\lambda j$ | $\lambda i$ | $\lambda j$ |

TABLE 2

The truth table of the binary O-AND gate as a special case

| Signal Input | Control Input | O-AND Gate Output |
|---|---|---|
| 0 | 0 | 0 |
| 0 | $\lambda i$ | 0 |
| $\lambda i$ | 0 | 0 |
| $\lambda i$ | $\lambda i$ | $\lambda i$ |

TABLE 1

The standard binary form for the binary O-AND gate

| Signal Input | Control Input | O-AND Gate Output |
|---|---|---|
| 0 | 0 | 0 |
| 0 | 1 | 0 |
| 1 | 0 | 0 |
| 1 | 1 | 1 |

Figure 9:
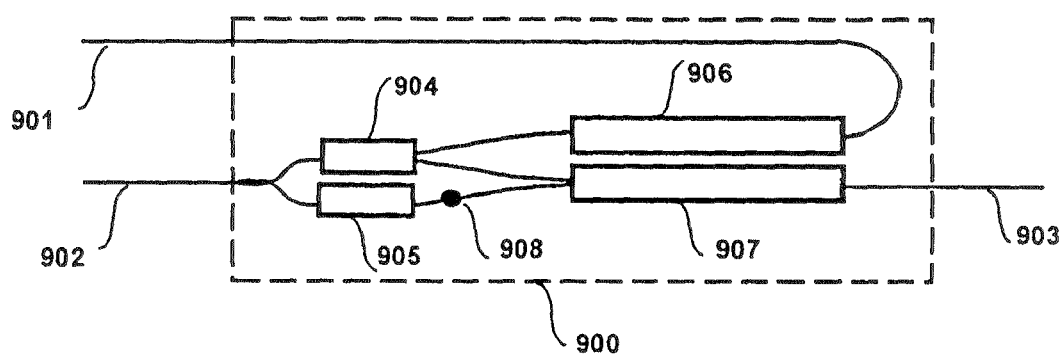
FIG. 9 The O-AND gate construction using the herein disclosed photonic transistor FIG. 11. The logic operator for the O-AND gate FIG. 10. The logic symbol of the O-AND gate FIG. 12. The signal input of the O-AND gate simulation Case-1

FIG. 9 shows the design of the N-nary O-AND gate 900 which has one control input 901, one signal input 902, and the output 903. The O-AND gate consists of two PTs, PT-1 904 and PT-2 905, and two SOAs, SOA-1 906 and SOA-2 907. The control signal to PT-1 is amplified by SOA-1 to create a power bias between the signal input and the control input to produce high cross-gain modulation within PT-1, in order to make the low output sufficiently low. PT-2 is identical to PT-1, in order to form a Mach-Zehnder interferometer. The control input of PT-2 is set at a constant zero, along with a 180° phase shifter 908, makes the Mach-Zehnder interferometer formed by PT-1 and PT-2 have a destructive recombination at the output. This destructive recombination of the Mach-zehnder interferometer cancels the high output of PT-1, resulting in the output of the O-AND gate as defined in Table 1. SOA2 is used to amplify the output signal to reach the same level of the input.

Figure 10:
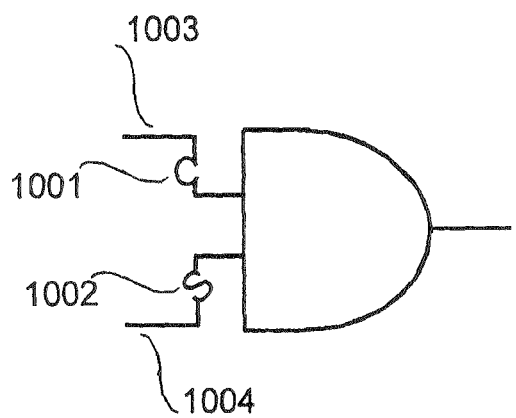

The logic symbol of the O-AND gate is shown in FIG. 10. Similar to the photonic transistor symbol, a "C" 1001 and an "S" 1002 is put on the input lines to signify control input 1003 and signal input 1004 respectively. However, when only one wavelength is used, the N-nary O-AND gate becomes a binary O-AND gate, in which case, the O-AND gate is symmetric. This means that one signal can be the control of the other, in exactly the same manner of Boolean logic.

Figure 11:

FIG. 11 shows the operator symbol of the O-AND gate. A big "O" circles around the AND to signify optical, which distinguishes the optical AND from the electrical AND.

The logic symbol, shown in FIG. 10, is used in photonics circuit designs in the same manner as the electrical AND gate symbol in electronics circuits. The logic operator, shown in FIG. 11, is used in mathematical logic manipulations in the same manner as those used the Boolean algebra.

O-AND Gate Simulation Case-1

Figure 12:
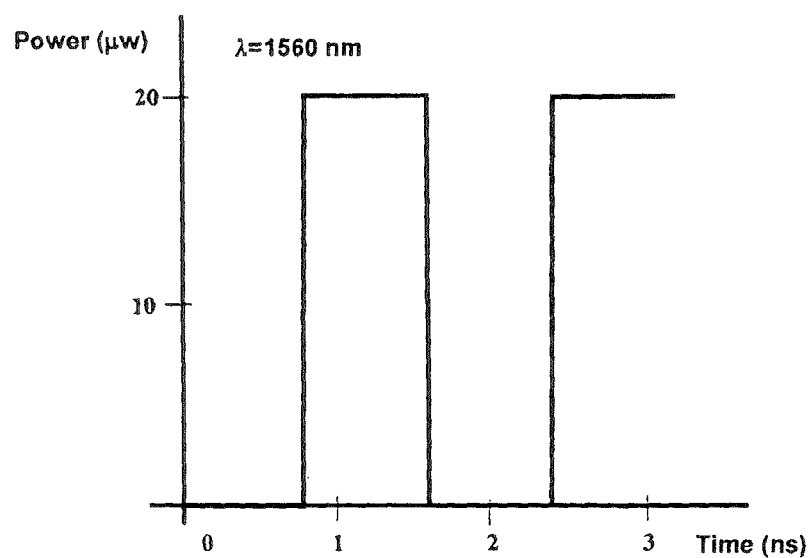
Figure 13:
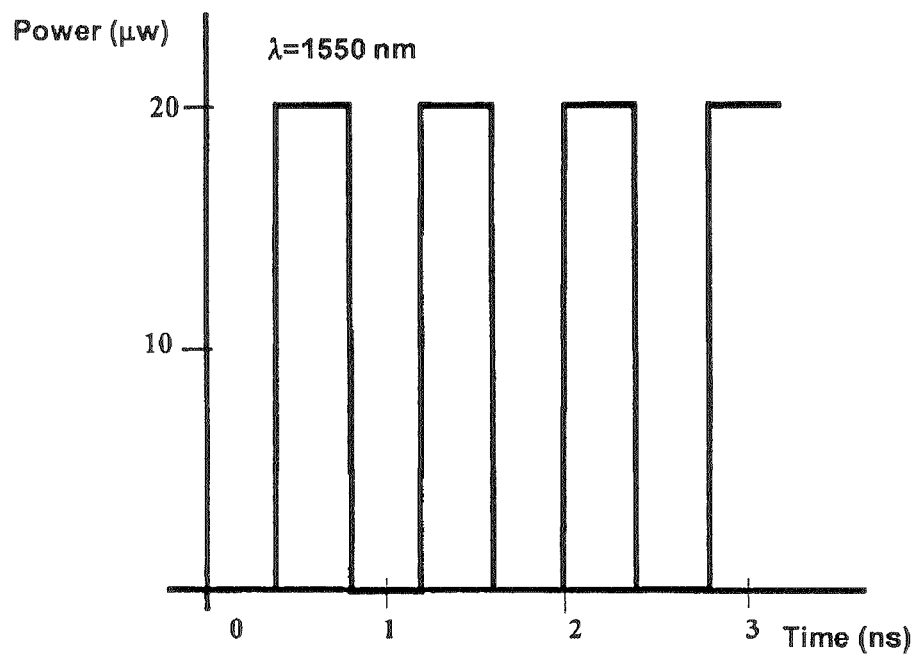
FIG. 13. The control input of the O-AND gate simulation Case-1
Figure 14:
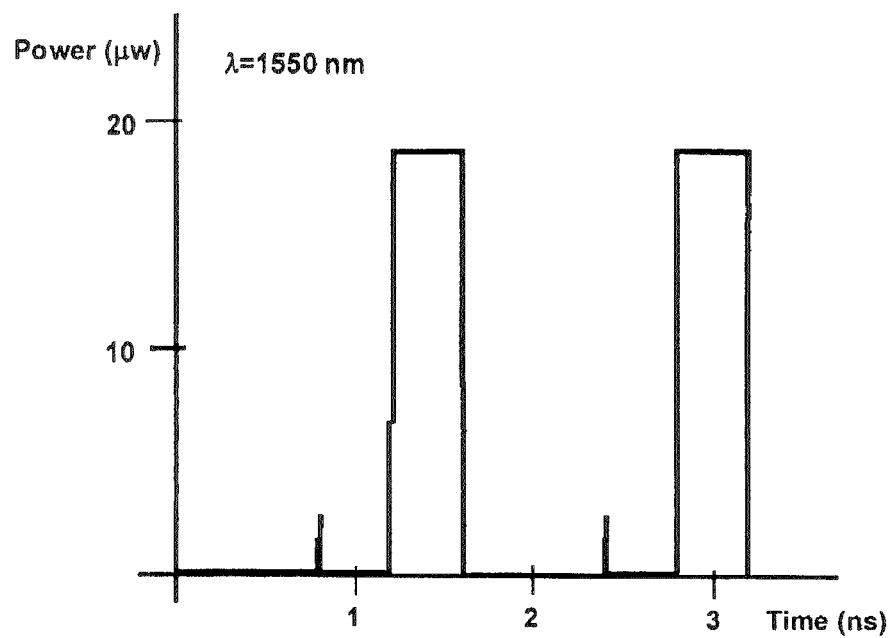
FIG. 14. The O-AND gate output of the simulation Case-1

The O-AND gate design shown in FIG. 9 was simulated using computer software. FIG. 12 is the signal input for the O-AND gate, which is generated by an amplitude modulator powered by a 1550 nm CW laser. FIG. 13 is the control input to the O-AND gate, which has the wavelength of 1560 nm. The output signal of the O-AND gate is given in FIG. 14. The result matches the truth table of the O-AND gate shown in Table 1.

O-AND Gate Simulation Case-2

Figure 15:
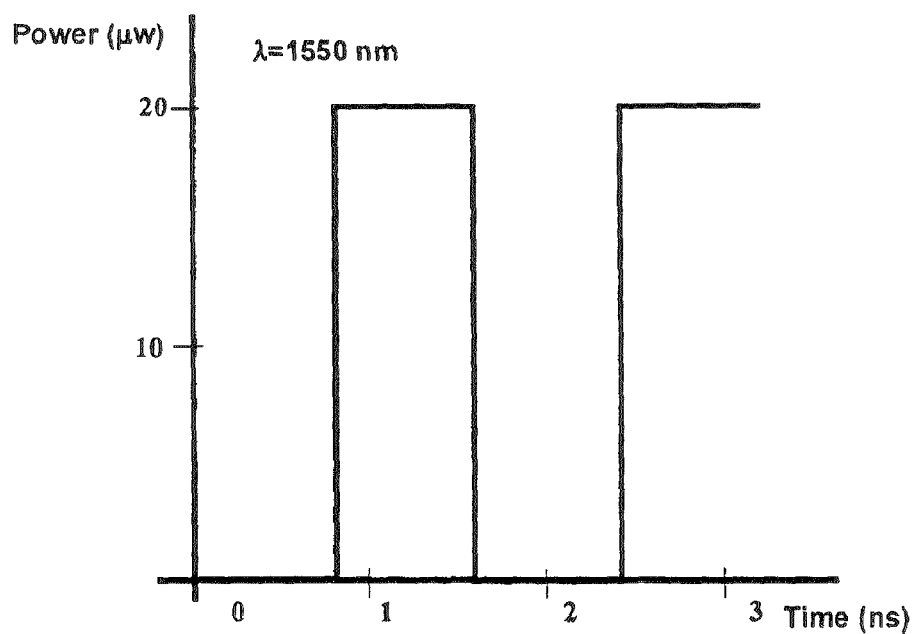
FIG. 15. The O-AND control input ($\lambda$=1550 nm) the O-AND gate simulation Case-2
Figure 16:
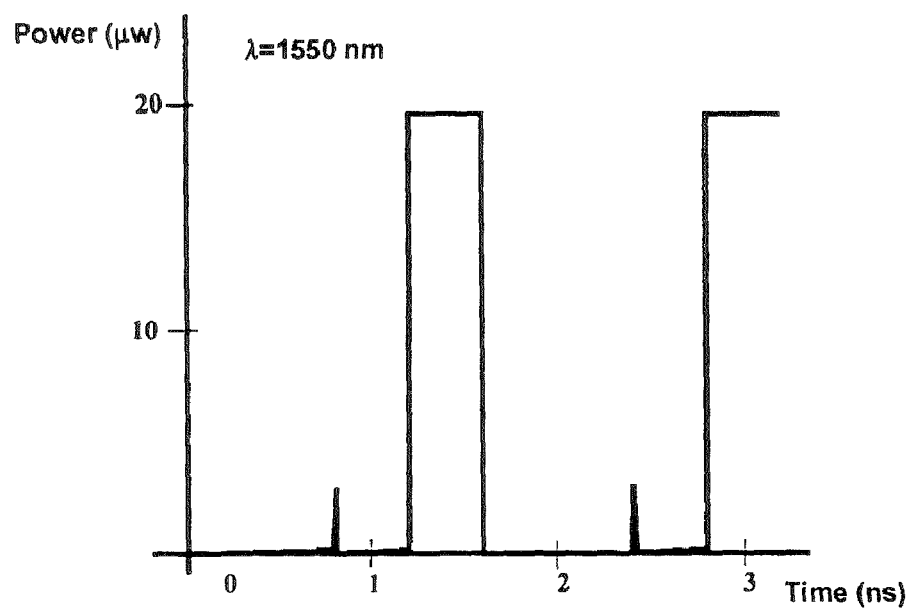
FIG. 16. The binary output of O-AND gate simulation Case-2

The binary case, when only one wavelength is used, was also tested at A=1550 nm. The same control signal of 1550 nm wavelength, shown in FIG. 13, was used. The signal input of 1550 nm is shown in FIG. 15. The output of the binary O-AND gate is given by FIG. 16. It can be seen that the result displays a Boolean binary logic AND.

Numerous other embodiments of the invention are possible without departing for the scope of this document.

The invention claimed is:

1. An N-nary photonic transistor (PT) structure including:
   a data input port, receiving a first input optical signal;
   a control input port, receiving a second input optical signal;
   an output port, outputting an output optical signal; and
   a nanometer-scale optical semiconductor structure photonic transistor body, comprising:
   (a) an active core that connects the data input port on one side and the control input port and the output port on the opposite side with the input optical signals going into the active core and the output optical signal coming out of the active core;
   (b) an N-InP substrate layer between the active core and the negative electrode for negative charge;
   (c) a P-InP layer between the active core and the positive electrode for positive charge; and
   (d) an insulator on each lateral side of the structure for efficient energy confinement;
   wherein the nanometer scale optical semiconductor structure provides functions of switching on or off between the data input port and the output port by the control signal from the control input port.

2. An N-nary optical AND (O-AND) gate structure comprising:
   the photonic transistor structure of claim 1, having a first photonic transistor and a second photonic transistor;
   a phase-shifter;
   wherein the first photonic transistor, the second photonic transistor, and the phase-shifter together form a Mach-Zehnder interferometer;
   a first optical semiconductor amplifier on a control input port of the O-AND gate, for amplifying a control input signal;
   a second semiconductor amplifier on an output port of the O-AND gate for amplifying the output optical signal; and wherein:
   the input port of the O-AND gate is connected to the input side of the Mach-Zehnder interferometer;
   the output port of the O-AND gate is connected to the output side of the Mach-Zehnder interferometer; and
   the control input port of the O-AND gate is connected to the control input of the first or the second photonic transistor in the Mach-Zehnder interferometer.

3. The N-nary photonic transistor structure of claim 1, wherein a number of lightwaves used is represented by N, N being ≧1, wherein N is determined by a system and a bandwidth of the photonic transistor.

4. The N-nary photonic transistor structure of claim 1, wherein the intensities of lights can be either low, close to dark, or high light intensity.

5. The N-nary photonic transistor structure of claim 1, wherein the control input receives a control light signal, the signal input port receives a data light signal, and the output port presents the output of the photonic transistor in accordance with the control and data inputs and obeys the following truth table:

| Data Input | Control Input | PT Output |
|---|---|---|
| 0 | 0 | 0 |
| 0 | $\lambda_i$ | 0 |
| $\lambda_j$ | 0 | $\lambda_j$ |
| $\lambda_j$ | $\lambda_i$ | 0. |

6. The N-nary photonic transistor structure of claim 1, wherein, when N=1, the transistor obeys the following truth table:

| Data Input | Control Input | PT Output |
|---|---|---|
| 0 | 0 | 0 |
| 0 | 1 | 0 |
| 1 | 0 | 1 |
| 1 | 1 | 0. |

7. The N-nary optical AND (O-AND) gate structure of claim 6, wherein the control input receives a control light signal, the signal input port takes a data light signal, and the output port presents an output of the O-AND gate in accordance with the control and data inputs and obeys the following truth table:

| Data Input | Control Input | O-AND Gate Output |
|---|---|---|
| 0 | 0 | 0 |
| 0 | $\lambda_i$ | 0 |
| $\lambda_j$ | 0 | 0 |
| $\lambda_j$ | $\lambda_i$ | $\lambda_j$. |

8. The N-nary O-AND gate structure of claim 7, wherein, when N=1, the O-AND gate obeys the Boolean logic shown in the following truth table:

| Data Input | Control Input | O-AND Gate Output |
|---|---|---|
| 0 | 0 | 0 |
| 0 | 1 | 0 |
| 1 | 0 | 0 |
| 1 | 1 | 1. |

* * * * *